Dec. 19, 1933.  T. M. CRAMER  1,940,118
PROCESS OF EXTRACTING BORAX FROM ORE
Filed Dec. 19, 1928
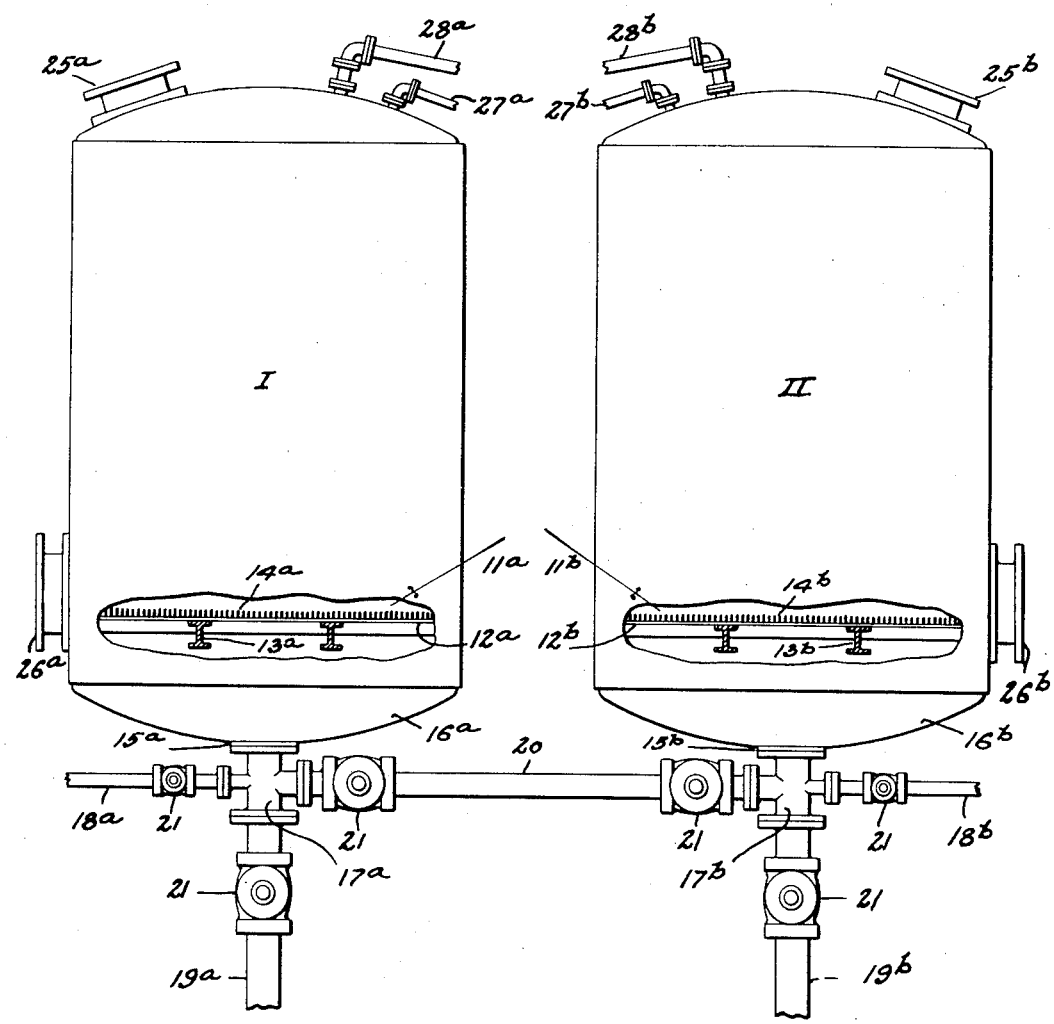
INVENTOR
Thomas M. Cramer
By
ATTORNEY Patented Dec. 19, 1933

1,940,118

UNITED STATES PATENT OFFICE 1,940,118

PROCESS OF EXTRACTING BORAX FROM ORE

Thomas M. Cramer, Long Beach, Calif., assignor to Pacific Coast Borax Company, a corporation of Nevada Application December 19, 1928. Serial No. 327,154

2 Claims. (Cl. 23—59)

This invention relates to a process and apparatus for extracting borax from borate ores and may be more particularly defined as a process for producing commercial borax

($Na_2O2B_2O_3.10H_2O$)

from ores containing crude sodium borate.

The most common forms of crude sodium borate ores are the crude prismatic borax and crude Rasorite.

The common method for the recovery of commercial borax from ores such as those mentioned above is a "wet process" in which the ore is pulverized and is treated with water or a mother liquor containing borax in an open tank at an elevated temperature. In the wet process the borax is dissolved in the water (or borax solution), leaving the gangue from which it is subsequently separated by filtration.

Ores which contain prismatic borax carry this compound in admixture with a gangue material which, when the ore is finely ground and treated with water, or even mechanically agitated unground in the presence of water to any extent, forms a slime, making very difficult the filtration of the solution from the gangue. I have found however that, if such an ore is merely crushed to a size at which it may be conveniently handled in elevators and conveyors, and is subjected to a treatment either with mother liquor or with water at a temperature substantially above 212 degrees Fahrenheit, borax enters into solution without the large breaking down of the gangue and the formation of slime as mentioned above, and, if the ore is supported upon a porous plate or grate within a suitable chamber or auto-clave, a borax solution may be removed therefrom which is practically free from slimes and which may be easily clarified.

It is a property of prismatic borax which facilitates this operation that, when prismatic borax is subjected to a temperature substantially above 212 degrees Fahrenheit, the prismatic borax dissolves in the water of crystallization with which it is associated in the prismatic form. It will thus be seen that, if ore containing crude prismatic borax is subjected to a temperature substantially above 212 degrees Fahrenheit, and is maintained under super-atmospheric pressure, the borax will dissolve in its own water of crystallization in which form it may be removed from the ore without forming the mud and slime commonly encountered in the ordinary process.

It is a primary object of this invention therefore to produce a process particularly adapted to use in connection with borate minerals containing gangue which have a tendency to mud and slime when treated with water. This process includes the steps of heating the mineral at a temperature substantially above 212 degrees Fahrenheit and under super-atmospheric pressure for the purpose of effecting the solution of the prismatic borax without a breaking down by sliming of the structure of the gangue with which the borate is associated.

If a process such as indicated above were carried out in a single auto-clave or closed chamber, the release of the solution resulting from a subjection of the mineral to the action of steam under a super-atmospheric pressure and elevated temperature, would result in a material thermal loss and it is, therefore, a further object of this invention to produce a process and an apparatus particularly adapted to use in connection with this process by means of which this thermal loss will be materially reduced. This is effected by using two or more auto-claves in tandem and, instead of releasing the solution at high temperature and pressure directly from one auto-clave to a receiving tank under atmospheric conditions, the solution is delivered to the other auto-clave which contains a fresh or a previously treated ore. The solution coming in contact with the charge of mineral in the second auto-clave dissolves a part of the sodium borate contained therein and at the same time the temperature and vapor pressure of the solution are materially reduced.

The borate mineral commonly known as Rasorite ($Na_2O.2B_2O_3.4H_2O$) is sodium borate in a form which is very slowly soluble in hot water under atmospheric conditions and, although this process has been developed primarily for use in connection with the borate ores containing prismatic borax in combination with the gangue which has a tendency to slime and hinder filtration, it will be apparent to those familiar with the art that the process is also adapted for use in connection with ore containing a mixture of Rasorite and prismatic borax, the conditions under which the process is carried out being particularly adapted to the treatment of Rasorite.

Other objects and advantages of this invention will be better understood from the following description of a preferred form of apparatus by means of which this process may be operated as shown in the accompanying drawing.

The apparatus used in the operation of this invention embodies a closed pressure vessel, preferably of cylindrical form and of the construction as illustrated. For the purpose of obtaining maximum thermal and extraction efficiency in the process it is preferable to use two of these vessels, I and II in a single unit. An important feature of the process is that these vessels have no stirring arrangement. Each of the vessels contains a grid or porous support indicated at 11a and 11b, which supports are placed a substantial distance above the bottom of the vessel. These grids are illustrated as consisting of metal grate constructions 12a and 12b supported by suitable joists 13a and 13b and the top of the grids may be covered by perforated plates or wire gauze of suitable mesh as indicated at 14a and 14b.

The vessels have suitable outlet connections 15a and 15b in the center of the dished bottoms 16a and 16b and four-way pieces or cross members 17a and 17b are attached thereto. The cross members 17a and 17b are provided with pipe connections indicated at 18a and 18b, 19a and 19b and 20, each of which is controlled by a valve generally indicated at 21. These pipe connections serve the following purpose: pipes 18a and 18b are adapted to supply steam into the vessels for treating the charges; connecting pipe 20 is provided for transferring the liquors from one vessel to the other, and the outlet pipes 19a and 19b are adapted to empty the vessels of liquor.

Manholes, indicated at 25a and 25b, are provided on top of each vessel for charging the same with ore to be treated, and manholes 26a and 26b are placed on the side of each vessel substantially on a level with the top of the grid screen inside of the vessel through which the spent ore is discharged after treatment; and these discharge manholes are preferably so positioned as to permit the raking out of the residue remaining on the grid and also of cleaning the vessel.

Reference numerals 27a and 27b indicate pipe connections for compressed air which may optionally be used to blow air into the vessels for drying the residue remaining upon the grids.

28a and 28b indicate feed pipes for introducing liquor, such as water or mother liquor, into the vessels, and the necessary pressure gauges, air vent and safety valves are of course installed but are not shown on the drawing.

My method of processing the ore is then as follows: In the operation of the invention, a charge of ore (the quantity being modified according to grade and purity of the ore and the size of the apparatus) is fed through the top manhole of vessel I and falls on the grid 11a. A form of water, such as mother liquor from previous operations, is admitted through the connection 28a and the quantity of this likewise depends on the richness of the crude material and is accordingly adjusted.

When the vessel I has been thus charged the manhole 25a is closed and steam is admitted through the bottom line 18a. The contents of the vessel are boiled and kept under a pressure of 30 to 50 lbs. for 20 to 30 minutes after which time the strong first liquor is discharged through line 19a into a settling tank. Nearly all the insoluble residue remains on the grid of the vessel forming a natural filter bed.

Mother liquor from a previous operation is then run on top of the residue through the connection 28a and approximately the same quantity of liquor is added as before so that the residue on the grid is well covered by this liquor. Steam is again turned on and the charge is kept under pressure for about twenty minutes, at the same time vessel II is being charged with crude ore only. The hot liquor from vessel I is then transferred through pipe 20 into vessel II by the steam pressure still in vessel I. The liquor penetrates through the crude ore on the grid in vessel II and the steam coming from vessel I, after the solution has been drawn off, attacks the ore and condenses in the liquor, thus effecting a material thermal saving by utilizing the heat in the solution to raise the temperature of the charge of ore. After this treatment the strong, hot liquor from vessel II is transferred by pressure to a settling tank (not shown) and the residue remaining on the grid is treated with weak mother liquor for a second time in the same way as the residue was treated in vessel I.

It is preferable in each cycle of the process to treat each batch of crude ore at least twice with liquor in order to dissolve all of the soluble sodium borate contained therein. This treatment leaves a residue upon the grids of the vessels in a condition such that it may be easily handled, but it will be understood that, for the purpose of reducing its weight, the treated residue may be further dried by means of compressed air which is introduced into the vessels through lines 27a and 27b. After the residue has been freed from liquor the manholes 26a and 26b are opened and the spent ore (which is rather coarse, porous and may be easily handled) is raked out of the vessel. The solution which is drawn from vessels I and II is delivered to settling tanks (not shown) where it is left at rest, and, after the small amount of mud residue mixed with the liquor has settled, the clear liquor is drawn off to recrystallizers or granulators where the commercial borax is extracted in the manner well known to those familiar with the art.

The small amounts of fine mud mixed with the liquor which remains in the settling tanks after the settling process may be treated with water and leached out immediately or may be allowed to accumulate, in which case this mud may be mixed with liquor and pumped from time to time on to a thick layer of residue in one of the vessels. In the latter case the liquor passes through the layer of residue and the fine solids are retained in the residue itself. A slight air pressure introduced into the vessel during this operation quickens the procedure and the filtering of the mud charges through a filter press in a special operation is thus eliminated.

It will be understood from the foregoing description that this invention embodies a process for treating ores containing sodium borate in which the ore itself forms a natural filter bed for separating the insoluble residue from the liquor, and it is suggested that, in order to obtain the best results, it is important not to use crude ore which has been too finely pulverized or crushed and that the charges not be agitated during their treatment. It will be seen therefore that the process eliminates two important and expensive steps which are ordinarily encountered in extracting values from ores such as crude sodium borates.

It will also be understood that, while I have herein described a preferred form of apparatus which may be used in the practice of my invention, and indicated a preferred cycle of operation, various changes in conditions and sequence of operations might be made by those familiar with the art without departing from the invention, the invention being limited only by the scope of the appended claims.

I claim as my invention:

1. A process for producing commercial borax from an ore containing prismatic borax and gangue material which includes the steps of heating the ore under super-atmospheric pressure to a temperature substantially above 212 degrees Farenheit for effecting the solution of the borax in its own water of crystallization.

2. A process of producing borax solutions from crude sodium borate ores by treating same unground and wet at a temperature sufficient to dissolve the sodium borate in its own water of crystallization in a closed pressure vessel which is provided with a grid for the purpose of retaining insoluble residue in the form of a natural filter bed through which the borax solution must pass when leaving the vessel.

THOMAS M. CRAMER.